E. & C. L. WALKER.
ICE CREAM DIPPER.
APPLICATION FILED FEB. 7, 1910.
1,012,944.
Patented Dec. 26, 1911.
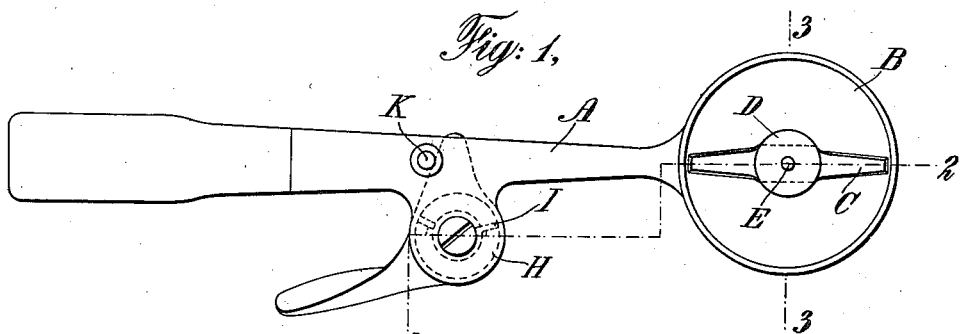
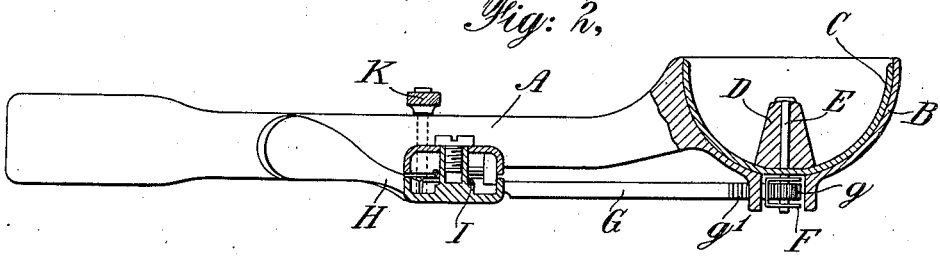
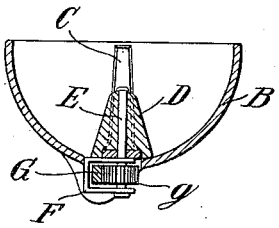
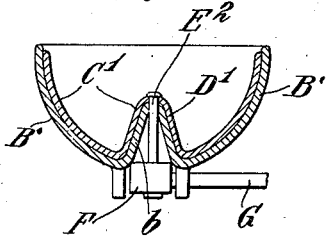
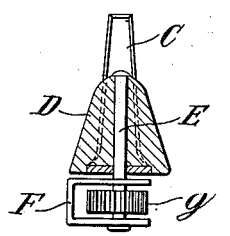
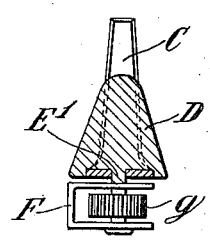
Edwin Walker and
Clarence L. Walker
Inventors
Witnesses:
By their Attorneys,

UNITED STATES PATENT OFFICE.

EDWIN WALKER AND CLARENCE L. WALKER, OF ERIE, PENNSYLVANIA.

ICE-CREAM DIPPER.

1,012,944.            Specification of Letters Patent.     Patented Dec. 26, 1911.

Original application filed January 9, 1909, Serial No. 471,389. Divided and this application filed February 7, 1910. Serial No. 542,379.

*To all whom it may concern:*

Be it known that we, EDWIN WALKER and CLARENCE L. WALKER, citizens of the United States, both residing in Erie, county of Erie, and State of Pennsylvania, have invented a certain new and useful Ice-Cream Dipper, of which the following is a specification.

This invention is an ice cream disher.
The subject matter of the present application is a division of a prior application filed Jan. 9, 1909, Serial No. 471,389.

The novel feature of this invention consists of means whereby an individual portion of cream may be delivered of such shape as to adapt it for use in making "sundæ" creams. Said means, in a preferred embodiment of the invention, comprises a mold or core which, preferably, operates in conjunction with a scraper or sweep, the latter coöperating with a cup of of the dipper or disher for the purpose of removing the cream from engagement therewith.

In the accompanying drawings we have illustrated different practical embodiments of the invention, but the constructions shown therein are to be understood as illustrative, only, and not as defining the limits of the invention.

Figure 1 is a plan view looking at the inside of the cup. Fig. 2 is a longitudinal section on the plane indicated by the dotted line 2—2 of Fig. 1. Fig. 3 is a vertical cross section on the line 3—3 of Fig. 1. Fig. 4 is a vertical section through a scraper having one form of an attached rotary core. Fig. 5 is a vertical section through a scraper with another form of attached rotary core. Fig. 6 is a sectional view illustrating another embodiment of the scraper wherein the core is an integral part of the cup.

The ice cream dipper or disher comprises a suitable frame, A, a cup, B, a rotatable scraper, C, a core, D, within the cup, and means for operating the scraper.

As shown, scraper, C, conforms to the interior contour of bowl or cup, B, so that it is positioned to work close to, or in contact with, the inner surface of said cup, whereby the scraper is adapted to operate effectively in sweeping the cream or ice from engagement with, or from adhering to, the cup.

According to this invention we associate with the scraper a certain device herein designated as a rotary core whereby a cavity is formed in the cream or ice molded by cup, B. Said device, or rotary core, may be of different forms, but as shown in Figs. 1, 2, 3, 4 and 5, the device is a core which is rotatable with scraper, C. Core, D, and scraper, C, are united or coupled by a short shaft, E, the latter extending through the middle portion of scraper, C, and extending centrally through core, D, see Figs. 3 and 4. If desired, however, core, D, may be in one piece with the shaft, as shown at E' in Fig. 5. The shaft extends at one end beyond the scraper and the core, and said shaft is mounted in a suitable support at the base of cup, B. It is preferred to connect the scraper detachably to the cup, as for example by the means illustrated in our prior application, whereby the scraper and the core remain connected during the operation of removing them from the cup and replacing said parts within the cup.

As shown, the scraper shaft is journaled in a support, F, and said shaft is provided with a gear pinion, $g$, whereby the gear pinion is adapted to be rotated by engagement with teeth, $g'$, of a reciprocating member, G, see Fig. 2. The scraper support, F, is removably fitted in the base of the cup so that the scraper and the core will be supported inside the cup for rotation therein.

Attention is called to the fact that when scraper, C, is rotated, it operates to cut the cream from the inner surface of the cup, and core, D, rotates with the scraper for the purpose of releasing itself from the cream or ice, whereby the product may be discharged from the cup easily and quickly, and at the same time, said product will have a cavity or pocket formed in the top surface of the cream or ice. This is a very desirable feature in dispensing cream, ice and analogous products, for the reason that fruit of any desired character may be disposed in the cavity of the cream or ice, or any other edible product may be placed in the cavity or pocket instead of the fruits heretofore mentioned.

Another embodiment of the invention is shown in Fig. 6 of the drawing wherein scraper, C', is shown as having a core, D', integral therewith. In this form of the invention the scraper and the core may be cast, or otherwise made, in one piece, and said core may be hollow in construction so as to receive an inwardly extending member, $b$, of cup, B'. The inwardly extending member, $b$, produces a stationary core within the cup, and the scraper is shaped to fit snugly to the inner surface of this core and to the inner surface of the cup, the center of the cup being depressed inwardly. Scraper, C', and its bent middle part fit snugly to the inner surface of the cup and the core so that the scraper will work close to, or in contact with, the inner surface of the cup and said core, $b$. The scraper is secured rigidly to a shaft, $E^2$, adapted to be operated by suitable means whereby the scraper is rotated within the cup.

Any desired means may be employed for rotating the scraper. As shown, member, G, engages with the pinion of the scraper shaft, and said member is pivoted to one arm of an angle lever, H. Said lever is supported on frame, A, so that another of its arms will be in a position for engagement by the thumb or fingers of the operator's hand. The lever may be turned in one direction to impart reciprocating motion to member, G, but the movement of the lever in the opposite direction is accomplished by the action of a spring, I, a stud, K, being in the path of the lever to limit its movement under the pressure of the spring.

The operation of the dipper will be apparent from the foregoing description taken in connection with the drawings. The utensil is manipulated by forcing cup, B, into the cream so as to take up a certain quantity thereof. When the dipper is withdrawn from the freezer, or other receptacle, the cup is inverted over a plate, saucer or the like, and lever, H, is operated to rotate scraper, C, thereby discharging the cream from the cup. The core, D, produces in the discharged cream a cavity or pocket wherein fruit or other edible substance may be deposited.

Having thus fully described the invention, what we claim as new, and desire to secure by Letters Patent is:

1. In an ice cream dipper, a cup, a core positioned therein and coöperating therewith for producing a cavity or pocket in the cream delivered from said cup for the purpose of receiving an additional edible product, and a scraper coöperating with said core.

2. In an ice cream dipper, a cup, means positioned therein and coöperating therewith for producing a cavity or pocket in the cream delivered from said cup for the purpose of receiving an additional edible product, and mechanism for rotating said means.

3. In an ice cream dipper, a cup, a scraper rotatable therein, and a core rotatable with said scraper.

4. In an ice cream dipper, a cup, a core positioned within the cup, and a rotatable scraper adapted to free the cream from the inner surface of the cup.

5. In an ice cream dipper, a cup, a substantially conical core therein, and a rotatable scraper operating within said cup.

In testimony whereof we have signed our names to this specification in the presence of two subscribing witnesses.

EDWIN WALKER.
CLARENCE L. WALKER.

Witnesses as to the signature of Edwin Walker:
 JOHN T. WILSON,
 F. H. McLAUGHLIN.

Witnesses as to the signature of Clarence L. Walker:
 CHARLES G. BREVILLIER,
 M. LEVANT DAVIS.